Figure 1:
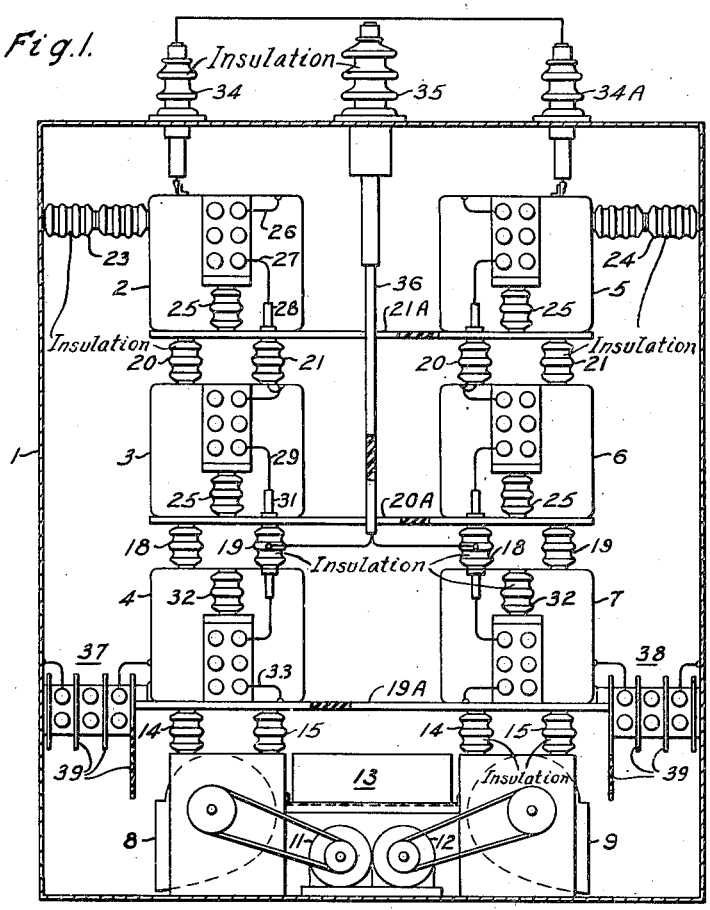

Oct. 11, 1949.  W. W. PENDLETON ET AL  2,484,245
RECTIFIER
Filed Aug. 31, 1944

WITNESSES:

INVENTORS
Wesley W. Pendleton, Leo J. Berberich
and Irving R. Smith.
BY
ATTORNEY Patented Oct. 11, 1949

2,484,245

UNITED STATES PATENT OFFICE 2,484,245

RECTIFIER

Wesley W. Pendleton, Leo J. Berberich, and Irving R. Smith, Pittsburgh, Pa., assignors to Westinghouse Electric Corporation, East Pittsburgh, Pa., a corporation of Pennsylvania Application August 31, 1944, Serial No. 552,140

3 Claims. (Cl. 175—366)

Our invention relates to high voltage rectifiers and, in particular, relates to methods of constructing support housings for such rectifiers in such a way as to prevent insulation breakdown and destructive electrical corona effects.

There are many types of electrical rectifiers, of which the well-known copper oxide and selenium rectifiers may be taken as examples, in which small unit rectifiers capable of giving an output voltage well under 100 volts are used, but which have such characteristics that a sufficient number of such units may be connected in series to give output voltages of the order of 70,000. In the case of many such rectifiers, it is necessary to provide structural elements, such as cooling fins, which can only be arranged with practicable economy of space, if they have sharp corners or edges. This is particularly true, for example, in the case of copper oxide rectifiers where the output voltage per single disc is 20 volts or less, and where it is customary to make the rectifiers in the form of an annular disc, many such discs being stacked alternately with annular cooling plates and supported on insulated through-bolts. The distance, separating successive cooling discs, is only of the order of ⅛ inch.

By reason of their almost indefinite life, copper oxide rectifiers have found a considerable field of usefulness in producing apparatus with direct current voltage ratings of many thousand volts for use as power supplies for radio transmitters and the like, and for furnishing rectified current for electrical precipitation of dust and gases. In this field they have proven far superior to rectifiers of the more familiar electron-tube type because of the short life of the latter.

As long as the output voltage of such rectifier remains of the order of a few hundreds, they offer no very complex problems in insulation, but when the output voltage rises into the tens of thousands, electrical corona becomes troublesome. As is well known, it is possible to prevent severe difficulties from such corona at voltages of the order mentioned, provided no portions of the electrical conductors at high potential are sharply pointed or have sharp edges; and, accordingly, it is the practice to terminate conductors for use at such voltages as spherical or cylindrical surfaces with substantial radius of curvature of the order of a large fraction of an inch or more. However, it will be evident that in the case of the cooling plates mentioned above in connection with low voltage rectifier units which have to be spaced apart by distances of an order of ⅛ of an inch, it is literally impossible to provide their peripheral edges with the large radius of curvature necessary to prevent severe corona loss under operating voltages of the order of tens of thousands. In short, it is utterly impractical to make such cooling discs otherwise than with fairly thin peripheral edges, and a problem of considerable difficulty therefore arises in devising an arrangement by which output voltages of the order of tens of thousands can be produced with such rectifiers.

One object of our invention is, accordingly, to provide an arrangement by which rectifier units, which are inherently of a low voltage type and restricted dimensions, can be provided with cooling surfaces, while being employed to superpose their voltages in rectifier aggregates having high output voltages.

Another object of our invention is to provide structural arrangements by which rectifier units of the disc type, provided with cooling flanges, may be serially assembled to give output voltages of the order of tens of thousands.

Still another object of our invention is to provide an arrangement by which corona discharges may be prevented when assembling large numbers of rectifiers of the disc type into aggregates capable of giving very high output voltages.

Other objects of our invention will become apparent upon reading the following description taken in connection with the drawing in which—

Figure 2:
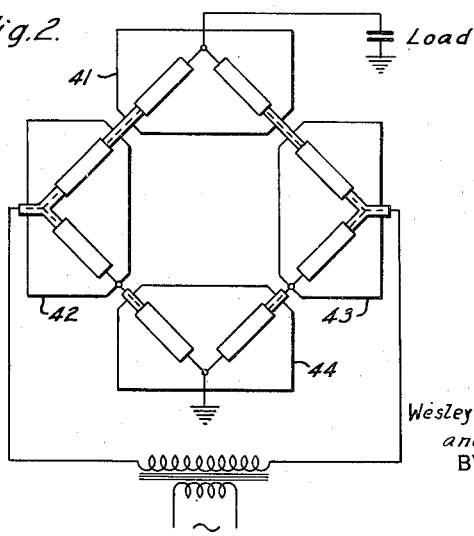

Figure 1 is a schematic illustration, partly in elevation, and partly in section, of an assemblage of copper oxide rectifier discs in accordance with the principles of our invention; and Fig. 2 is a schematic illustration of a modified form of our invention.

Referring in detail to the drawing, a housing 1 which may be of sheet metal encloses an assemblage of six subchambers, 2, 3, 4, 5, 6, and 7, each having metallic walls, a portion of which are of screening or perforated sheet metal through which air for ventilating purposes may readily pass. The lower portion of the container 1 contains blowers 8, 9 for forcing cooling air to circulate through the interior of the housing 1.

The blowers 8, 9 are conveniently driven respectively by electric motors 11, 12, the elements 8 through 12 being electrically connected to the casing 1. The elements 8 through 12 may comprise any conventional air circulating system suitable for causing circulation and cooling of the air within the container 1 and form only an auxiliary component in our present invention. A water cooled heat exchanger 13 of conventional type may be supported above the motors 11 and 12 to assist in cooling the air which they circulate. The air from blowers 8 and 9 circulates up the outside and down through the central portion of the housing 1. Suitable baffles (not shown) to constrain the air to flow through the rectifier stacks may be provided.

The rectifier housing chambers 4 and 7 are respectively supported on insulators 14, 15 of conventional type, standing on supporting frames above the level of blowers 8, 9. The rectifier chambers 3, 6 are similarly supported on insulators 18 and 19, standing on top of the chambers 4, 7 and the rectifier chambers 2, 5 are respectively supported on similar insulators 20, 21, resting on top of the rectifier chambers 3, 6. The rectifier chambers 2, 5 are, likewise, preferably supported against lateral movement by insulators 23, 24, bearing on the side walls of the chamber 1. Insulating bars 19A, 20A and 21A extend across horizontally between the tops of insulators 14 to 21 and increase the structural stability of the arrangement.

Each of the rectifier chambers 2 through 7 contains six rows of copper oxide rectifier stacks, each rectifier stack being an assembly of annular discs supported on a through-bolt which may be of metal having a covering of some sufficient thickness of an insulating material such as, for example, a phenolic condensation product. The rectifier discs may be of the type described in C. C. Hein Patent No. 2,304,090 assigned to the assignee of this present application, each disc comprising a copper base coated on one side with cuprous oxide, and having a contact layer comprising a lead washer bearing against the graphitized oxide surface. Each such disc together with the lead washer constitutes a rectifier unit, and for cooling purposes such units are stacked one on top of the other with an annular disc or plate of sheet copper or other metal sandwiched between them at intervals as required to dissipate heat therefrom. The rectifier stacks, just described, do not in themselves constitute our invention, but are merely the prior art components to which the invention we herein claim is applied.

The above-mentioned six-row aggregates of rectifier discs, as just described, are supported by appropriate end frames engaging their through-bolts on the tops of insulators 25, which, in turn, rest on the bottom wall of the chambers 2, 3, 5 and 6. In the case of chambers 4 and 7 the rectifier aggregates resting on the floors of those chambers are braced by insulators 32. The six rectifier rows in each chamber are connected to add their voltages in series, that in chamber 2, for example, having an in-lead 26 and an out-going lead 27 across which this aggregate voltage is found. The in-lead 26 is connected to the wall of the chamber 2, while the out-going lead 27 passes downward through an appropriate insulating bushing 28. An exactly similar in-lead and out-lead 29 is found in the rectifier chamber 3. The spacing of all the current carrying conductors in the chamber 2 from the side and end walls thereof, is sufficient for insulating purposes and to prevent any substantial corona discharge from forming.

It will be noted that the maximum voltage existing between any conductors within the chamber 2 is that between the out-lead conductor 27 and the walls of chamber 2. The corners and edges of the chamber 2 are all rounded with a substantial radius of curvature sufficient to prevent substantial corona discharge between the chamber 2 and the walls of housing 1, as will be discussed in more detail below.

The end of the out-lead conductor 27 is connected to the metal wall of rectifier chamber 3, and thence directly to one end of the series of six rectifier rows housed within the chamber 3, in exactly the same way as the rectifier rows in the chamber 2 already discussed. The out-lead conductor 29 from the rectifier stacks within chamber 3 passes through an insulating bushing 31 in the base thereof, and thence into rectifier chamber 4.

Rectifier chamber 4 is arranged with an insulator 32 attached to its uper face, and thpe latter biases six rectifier rows precisely similar to those already desuribed in the case of chambers 2 and 3. Except that the rectifier rows are positioned below the insulator 32, whereas the rows in chambers 2 and 3 are positioned above the insulators 25, the general arrangement inside chamber 4 is like that in chambers 2 and 3. The out lead 33 from the series of six rectifier rows in chamber 4 is connected to the wall of the latter.

A suitable conductor, connected to the walls of the rectifier chamber 2, passes through an insulating bushing 34 to form one of the direct current terminals of the entire rectifier aggregate.

The rectifier chambers 5, 6 and 7 are positioned on the opposite side of the central plane of the housing 1 from the rectifier chambers 2, 3 and 4, and are symmetrically located relative to the latter, and provided with exactly similar internal structures and electrical connections. The conductor passing through bushing 34 and the similar one 34A connecting to chamber 5 may be connected together if desired.

Substantially in the central plane, a pair of insulating bushings 35, through which the alternating current is led into the chamber 1, are positioned in locations sufficiently spaced apart for insulating purposes in a direction perpendicular to the plane of the paper. Insulating tubes 36 of suitable type, supported from the lower ends of the bushings 35, insulate the entire length of the alternating current in-lead wires, one of which is bent to the left to make contact with the conductor 29. The other alternating current in-lead wire is bent to the right and makes a similar contact with the lead between rectifier chambers 6 and 7.

Between the side wall of the housing 1 and the adjacent wall of the rectifier chambers 4 and 7 are supported an assemblage 37 and 38 of six rows of rectifier stacks substantially similar to the six rows already described, as assembled within rectifier chamber 2. The rows 37 and 38 are supported by their through-bolts on suitable end-partitions, and are preferably separated and insulated from each other by partitions 39 of insulating material which may, for example, be a phenolic condensation product. Opposite ends of the rectifier row 37 are respectively connected to the rectifier chamber 4 and to the casing 1; and a similar statement applies to the rows 38 and rectifier chamber 7.

It will be noted that the rectifier rows in the chambers 2 and 3 are serially connected with each other and may be considered to constitute one arm of a four-arm bridge, or so-called Graetz connection of rectifiers, the other arms being, respectively, the rectifier rows in chambers 5 and 6, the rectifier rows in chamber 4 together with the rectifier rows 37, and the rectifier aggregate in chamber 7 together with the rectifier rows 38. It will be noted that one side of the alternating current lines is connected to the junction between the bridge arm comprising chambers 2 and 3, and the bridge arm comprising the chamber 4 and rows 37; and that the other side of the alternating current line is connected to the junction between the bridge arm comprising chambers 5 and 6, and the bridge arm comprising chamber 7 and rows 38. The lower ends of the two bridge arms, respectively containing rows 37 and 38, are connected together to the housing 1 and constitute one terminal of the direct current circuit which is thus adapted to be grounded, while the upper terminals of the two bridge arms which respectively contain the rectifier chambers 2 and 5 may be connected to each other, and constitute the other direct-current terminal of the bridge aggregate.

It will be noted that the potential difference existing across the bridge arm which comprises the rectifiers in chambers 2 and 3 is equally divided between these two chambers. On the other hand, the maximum potential difference between any pair of conductors in the chamber 2, for example, exists between the out-lead conductor 27 and the walls of that chamber. Similarly, the maximum potential difference existing inside the rectifier chamber 3, exists between the out-lead conductor 29 and the walls of chamber 3. The rectifier chambers 2 through 7 obviously constitute Faraday cages which cut off from the objects placed in their interior any effects of electrical potential and fields existing outside their confines within the chamber 1. The maximum voltage available, therefore, to produce corona discharge or other insulation difficulties within the chamber 2, is that voltage which exists between the out-lead conductor 27 and the walls of chamber 2, and this is only half the potential difference between the opposite terminals of the bridge arm which comprises the chambers 2 and 3. Exactly similar statements apply to the chambers 5 and 6.

Similarly, the walls of chamber 4 shield the objects in its interior from the effects of any electrical fields, existing outside its confines, and the maximum potential difference between any two points within the chamber 4 is that existing between the in-lead conductor from chamber 3 and the out-lead conductor 33. This last named potential difference is obviously one half that existing across the outside terminals of the bridge arm which comprises chamber 4 and rows 37, and so only one half the potential difference across the bridge arm is available to produce corona discharges within the chamber 4. Exactly similar statements apply to the contents of chamber 7.

The rectifier rows 37 and 38 are positioned in the lower part of the housing 1, so that the maximum potentials available for producing corona discharge or electric fields in their vicinity are those existing respectively between the chambers 4 and 7 and the housing 1 and these potentials are obviously only equal to the potential existing at any instant across the rectifier rows 37 and 38. The latter are equal to only one half the potential existing across the two bridge arms which comprise, respectively, the chamber 4 and rows 37, and the chamber 7 and rows 38. Only one half the potential existing across one arm of the rectifier bridge is thus present to cause corona discharge from the elements of rows 37 and 38. None of the rectifier rows is subjected to voltage-stresses greater than one half the voltage of one rectifier bridge-arm; and on a rectifier aggregate to furnish a 70,000 volt direct-current output, it is easily possible to prevent corona-discharge within the rectifier chamber under such conditions.

It will be noted that the chamber 2 is at the potential of the ungrounded direct-current terminal of the rectifier, and, hence, at a potential equal to the direct-current output voltage relative to the housing 1. As has been stated previously, this potential difference would be sufficient to produce corona discharges of injurious magnitude from conductors which had sharp points or edges. Since all of the rectifier chambers are arranged to have no such sharp points or edges on their surface, but are given contours having a minimum radius of curvature sufficient to prevent corona discharge, the fact that the chambers 2 and 5 are at high potential difference from the housing 1 does not result in serious corona loss. The chambers 3, 4, 6 and 7 are obviously at lower potential difference from the housing 1 than are chambers 2, 5; hence, corona difficulties do not arise in connection with chambers 3, 4, 6 and 7.

The arrangement which we have described has been found sufficient to take care of rectifiers having output voltages of the order of 70,000. However, it will be evident that where even higher output voltages are desired, the rectifier arms may each be divided into more than two rectifier chambers in accordance with the principles of our invention.

Referring in detail to Fig. 2, it is possible where lower output voltages are to be dealt with, in effect, to consolidate chambers 2 and 5 into a single chamber 41, chambers 3 and 4 into a single chamber 42, chambers 6 and 7 into a single chamber 43, and to incorporate the rectifier rows 37, 38 in a single chamber 44. In such circumstances, the chamber 41 is connected to one output terminal, the chambers 42 and 43 are connected to terminals of the rectifier rows which they contain, and the chamber 44 connected to ground.

It is, of course, possible to connect a plurality of chambers such as housing 1 in cascade, the housing of one rectifier aggregate being connected to the ungrounded terminal of that rectifier aggregate which is closer than itself to earth potential. Each such housing would contain a bridge or other rectifier aggregate and be supplied with power from its own transformer secondary winding.

In accordance with the patent statutes, we have described particular embodiments of the principles of our invention, but those principles are capable of broader application in ways which will be evident to those skilled in the art.

We claim as our invention:

1. In combination with a rectifier bridge, each arm of said bridge comprising a plurality of serially connected rectifier units, enclosing chambers of conducting material for each said rectifier unit except the end units adjacent one corner of said bridge, each said chamber being connected to one terminal of the rectifier unit it contains and a housing enclosing said bridge connected to said bridge at said one corner, terminals for a direct current circuit at said one corner and the corner of said bridge diagonally opposite thereto, and terminals for an alternating current circuit connected to the two other corners of said bridge.

2. In combination with a rectifier bridge, each arm of said bridge comprising a plurality of serially connected rectifier units, enclosing chambers having walls of conducting material containing openings putting said units into communication with the atmosphere outside said chambers for each said rectifier unit except the end units adjacent one corner of said bridge, each said chamber being connected to one terminal of the rectifier unit it contains, and a housing enclosing said bridge connected to said bridge at said one corner, terminals for a direct current circuit at said one corner and the corner of said bridge diagonally opposite thereto, and terminals for an alternating current circuit connected to the two other corners of said bridge.

3. In combination with a rectifier bridge, each arm of said bridge comprising a plurality of serially connected rectifier units, enclosing chambers having walls of conducting material containing openings putting said units into communication with the atmosphere outside said chambers for each said rectifier unit except the end units adjacent one corner of said bridge, each said chamber being connected to one terminal of the rectifier unit it contains, and a housing enclosing said bridge connected to said bridge at said one corner, terminals for a direct current circuit at said one corner and the corner of said bridge diagonally opposite thereto, and terminals for an alternating current circuit connected to the two other corners of said bridge, said housing containing a blower for circulating the atmosphere within said casing through the openings in said rectifier-enclosing chambers.

WESLEY W. PENDLETON.
LEO J. BERBERICH.
IRVING R. SMITH.

REFERENCES CITED

The following references are of record in the file of this patent:

UNITED STATES PATENTS

| Number | Name | Date |
| --- | --- | --- |
| 676,105 | Thomas | June 11, 1901 |
| 1,759,230 | Dubilier | May 20, 1930 |
| 1,963,606 | Bailey | June 19, 1934 |
| 2,019,939 | Suller | Nov. 5, 1935 |
| 2,119,113 | Olving | May 31, 1938 |
| 2,169,109 | Muller | Aug. 8, 1939 |
| 2,179,293 | Hein | Nov. 7, 1939 |
| 2,285,437 | Johannson | June 9, 1942 |

FOREIGN PATENTS

| Number | Country | Date |
| --- | --- | --- |
| 296,596 | Great Britain | Sept. 6, 1928 |